US012608193B2

(12) United States Patent

Tzabary et al.

(10) Patent No.: US 12,608,193 B2

(45) Date of Patent: Apr. 21, 2026

(54) TECHNIQUES FOR CLOUD DEPLOYMENT AUTOMATION BASED ON CYBERSECURITY SCANNING

(71) Applicant: Wiz, Inc., New York, NY (US)

(72) Inventors: Or Tzabary, Tel Aviv (IL); Ami Luttwak, Binyamina (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/762,203

(22) Filed: Jul. 2, 2024

(65) Prior Publication Data

US 2026/0010357 A1 Jan. 8, 2026

(51) Int. Cl.
| | |
|---|---|
| *G06F 9/44* | (2018.01) |
| *G06F 8/30* | (2018.01) |
| *G06F 8/65* | (2018.01) |
| *G06F 9/455* | (2018.01) |
| *G06F 9/50* | (2006.01) |
| *G06F 11/3604* | (2025.01) |
| *G06F 21/55* | (2013.01) |
| *G06F 21/56* | (2013.01) |

(52) U.S. Cl.
CPC .................. *G06F 8/65* (2013.01); *G06F 8/30* (2013.01); *G06F 9/45558* (2013.01); *G06F 9/5072* (2013.01); *G06F 11/3604* (2013.01); *G06F 21/554* (2013.01); *G06F 21/562* (2013.01)

(58) Field of Classification Search
None
See application file for complete search history.

(56) References Cited

U.S. PATENT DOCUMENTS

| | | | |
|---|---|---|---|
| 9,471,384 | B2 | 10/2016 | Messerli |
| 9,851,933 | B2 | 12/2017 | Brech et al. |
| 11,032,360 | B2 | 6/2021 | Hosie et al. |
| 2015/0052517 | A1* | 2/2015 | Raghu ..................... H04L 67/10 718/1 |
| 2020/0057686 | A1* | 2/2020 | Huang ................ G06F 11/2025 |
| 2021/0240539 | A1* | 8/2021 | Murthy ............... G06F 11/3452 |
| 2022/0345483 | A1* | 10/2022 | Shua ...................... H04L 9/0825 |
| 2023/0031998 | A1* | 2/2023 | Boyapalle ............. G06F 9/4856 |
| 2023/0208873 | A1* | 6/2023 | Gabay ................. H04L 63/1416 726/22 |
| 2023/0315397 | A1* | 10/2023 | Prasad Tanniru ......... G06F 8/33 |

(Continued)

FOREIGN PATENT DOCUMENTS

| | | |
|---|---|---|
| KR | 101578177 B1 | 12/2015 |

OTHER PUBLICATIONS

CN 117909083, Apr. 2024 (Year: 2024).*

*Primary Examiner* — Insun Kang

(74) *Attorney, Agent, or Firm* — M&B IP Analysts, LLC

(57) ABSTRACT

A system and method for optimizing the deployment of a cloud computing environment is presented. The method includes: inspecting the cloud computing environment; generating a representation of the cloud computing environment based on a result of inspecting the cloud computing environment; determining a resource cost associated with each entity of a plurality of entities represented in the generated representation of the cloud computing environment; generating an optimization action for an entity of the plurality of entities, wherein the optimization action reduces the determined resource cost; and initiating the optimization action in the cloud computing environment.

28 Claims, 4 Drawing Sheets

(56) References Cited

U.S. PATENT DOCUMENTS

2024/0028360 A1* 1/2024 Genchev ................... G06F 9/50
2024/0129310 A1* 4/2024 Andrews ................. G06F 21/64
2024/0179169 A1* 5/2024 Seveloff ............... G06F 9/5027

* cited by examiner

START

S210

GENERATE AN INSPECTABLE DISK BASED ON A
SOFTWARE CONTAINER VOLUME

S220

READ MANIFEST OF THE INSPECTABLE DISK

S230

INITIATE A CYBERSECURITY INSPECTION WITH AN
ORDER BASED ON THE MANIFEST

S240

INITIATE A MITIGATION ACTION OF A DETECTED
CYBERSECURITY THREAT

END

TECHNIQUES FOR CLOUD DEPLOYMENT AUTOMATION BASED ON CYBERSECURITY SCANNING

TECHNICAL FIELD

The present disclosure relates generally to the deployment of virtual instances and specifically to resource optimization in provisioning resources for virtual instance deployment in cloud computing environments.

BACKGROUND

Cloud computing environments are expensive to maintain due to several factors. The infrastructure requires significant capital investment for servers, data centers, and networking equipment. Operational costs add up through energy consumption, cooling systems, maintenance, and security measures to protect data and services. Additionally, cloud providers often charge for data transfer, storage, and specific service usage, leading to substantial ongoing expenses.

Overprovisioning resources is problematic because it involves allocating more computing power, storage, or bandwidth than necessary to ensure reliability and performance. While this approach mitigates the risk of resource shortages, it leads to inefficiencies and higher costs. Resources that remain idle still incur charges, and the excess capacity does not contribute to productive workloads. Consequently, businesses pay for unused potential, inflating their expenses without corresponding benefits. Balancing the need for scalability and cost-efficiency becomes a delicate challenge, requiring precise demand forecasting and resource management.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting the cloud computing environment. Method may also include generating a representation of the cloud computing environment based on a result of inspecting the cloud computing environment. Method may furthermore include determining a resource cost associated with each entity of a plurality of entities represented in the generated representation of the cloud computing environment. Method may in addition include generating an optimization action for an entity of the plurality of entities, where the optimization action reduces the determined resource cost. Method may moreover include initiating the optimization action in the cloud computing environment. Other embodiments of this aspect include corresponding computer systems, apparatus, and computer programs recorded on one or more computer storage devices, each configured to perform the actions of the methods.

Implementations may include one or more of the following features. Method may include: determining a usage baseline for the entity of the plurality of entities; detecting an anomalous usage based on the determined usage baseline; and generating the optimization action further based on the detected anomalous usage. Method may include: inspecting a resource deployed in the cloud computing environment; detecting in the resource a plurality of software components, each software component associated with a resource cost; and generating the optimization action based on the associated resource cost of each software component. Method may include: initiating the optimization action to update a software component of the plurality of software components. Method may include: detecting a resource in the cloud computing environment having a resource usage below a predetermined threshold; and initiating the optimization action to deprovision the detected resource. Method may include: detecting a network bandwidth usage below a predetermined threshold; and detecting a disk usage below another predetermined threshold. Method may include: detecting in the representation a principal associated with a plurality of resources; and determining a resource cost of the principal based on each resource cost of a resource of the plurality of resources. Method may include: detecting a code object utilized to deploy a plurality of resources in the cloud computing environment; and generating a new code object based on the detected code object, where a resource deployed based on the new code object utilizes fewer resources than a resource deployed based on the detected code object. Method may include: detecting a code object utilized to deploy a resource in the cloud computing environment; analyzing the code object to detect a resource usage pattern; and generating a new code object, in response to determining that the detected resource usage pattern exceeds a predetermined threshold. Method may include: initiating the optimization action in response to detecting a misconfiguration of an entity of the plurality of entities. Method may include: generating the optimization action to increase utilization of any one of: a processor, a memory, a storage, a network bandwidth. Method may include: determining a usage baseline for the entity of the plurality of entities; detecting an anomalous usage based on the determined usage baseline; and generating a potential cybersecurity threat event based on the detected anomalous usage. Method may include: initiating an inspection of the entity. Method may include: generating an inspectable disk based on a disk associated with the entity; and inspecting the inspectable disk for a cybersecurity object, where the cybersecurity object indicates that the potential cybersecurity threat is an actual cybersecurity threat. Method may include: initiating a remediation action in response to detecting the cybersecurity object, where the remediation action is based on the actual cybersecurity threat. Implementations of the described techniques may include hardware, a method or process, or a computer tangible medium.

In one general aspect, non-transitory computer-readable medium may include one or more instructions that, when executed by one or more processors of a device, cause the device to: inspect the cloud computing environment; generate a representation of the cloud computing environment based on a result of inspecting the cloud computing environment; determine a resource cost associated with each entity of a plurality of entities represented in the generated representation of the cloud computing environment; generate an optimization action for an entity of the plurality of entities, where the optimization action reduces the determined resource cost; and initiate the optimization action in the cloud computing environment. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect the cloud computing environment. System may in addition generate a representation of the cloud computing environment based on a result of inspecting the cloud computing environment. System may moreover determine a resource cost associated with each entity of a plurality of entities represented in the generated representation of the cloud computing environment. System may also generate an optimization action for an entity of the plurality of entities, where the optimization action reduces the determined resource cost. System may furthermore initiate the optimization action in the cloud computing environment. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine a usage baseline for the entity of the plurality of entities; detect an anomalous usage based on the determined usage baseline; and generate the optimization action further based on the detected anomalous usage. System where the memory contains further instructions which when executed by the processing circuitry further configure the system to: inspect a resource deployed in the cloud computing environment; detect in the resource a plurality of software components, each software component associated with a resource cost; and generate the optimization action based on the associated resource cost of each software component. System where the memory contains further instructions which when executed by the processing circuitry further configure the system to: detect a resource in the cloud computing environment having a resource usage below a predetermined threshold; and initiate the optimization action to deprovision the detected resource. System where the memory contains further instructions which when executed by the processing circuitry further configure the system to: detect a network bandwidth usage below a predetermined threshold; and detect a disk usage below another predetermined threshold. System where the memory contains further instructions which when executed by the processing circuitry further configure the system to: detect in the representation a principal associated with a plurality of resources; and determine a resource cost of the principal based on each resource cost of a resource of the plurality of resources. System where the memory contains further instructions which when executed by the processing circuitry further configure the system to: detect a code object utilized to deploy a plurality of resources in the cloud computing environment; and generate a new code object based on the detected code object, where a resource deployed based on the new code object utilizes fewer resources than a resource deployed based on the detected code object. System where the memory contains further instructions which when executed by the processing circuitry further configure the system to: detect a code object utilized to deploy a resource in the cloud computing environment; analyze the code object to detect a resource usage pattern; and generate a new code object, in response to determining that the detected resource usage pattern exceeds a predetermined threshold. System where the memory contains further instructions which when executed by the processing circuitry further configure the system to: initiate the optimization action in response to detecting a misconfiguration of an entity of the plurality of entities. System where the memory contains further instructions which when executed by the processing circuitry further configure the system to: generate the optimization action to increase utilization of any one of: a processor, a memory, a storage, a network bandwidth. System where the memory contains further instructions which when executed by the processing circuitry further configure the system to: determine a usage baseline for the entity of the plurality of entities; detect an anomalous usage based on the determined usage baseline; and generate a potential cybersecurity threat event based on the detected anomalous usage. System where the memory contains further instructions which when executed by the processing circuitry further configure the system to: initiate inspection of the entity. System where the memory contains further instructions which when executed by the processing circuitry further configure the system to: generate an inspectable disk based on a disk associated with the entity; and inspect the inspectable disk for a cybersecurity object, where the cybersecurity object indicates that the potential cybersecurity threat is an actual cybersecurity threat. System where the memory contains further instructions which when executed by the processing circuitry further configure the system to: initiate a remediation action in response to detecting the cybersecurity object, where the remediation action is based on the actual cybersecurity threat. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
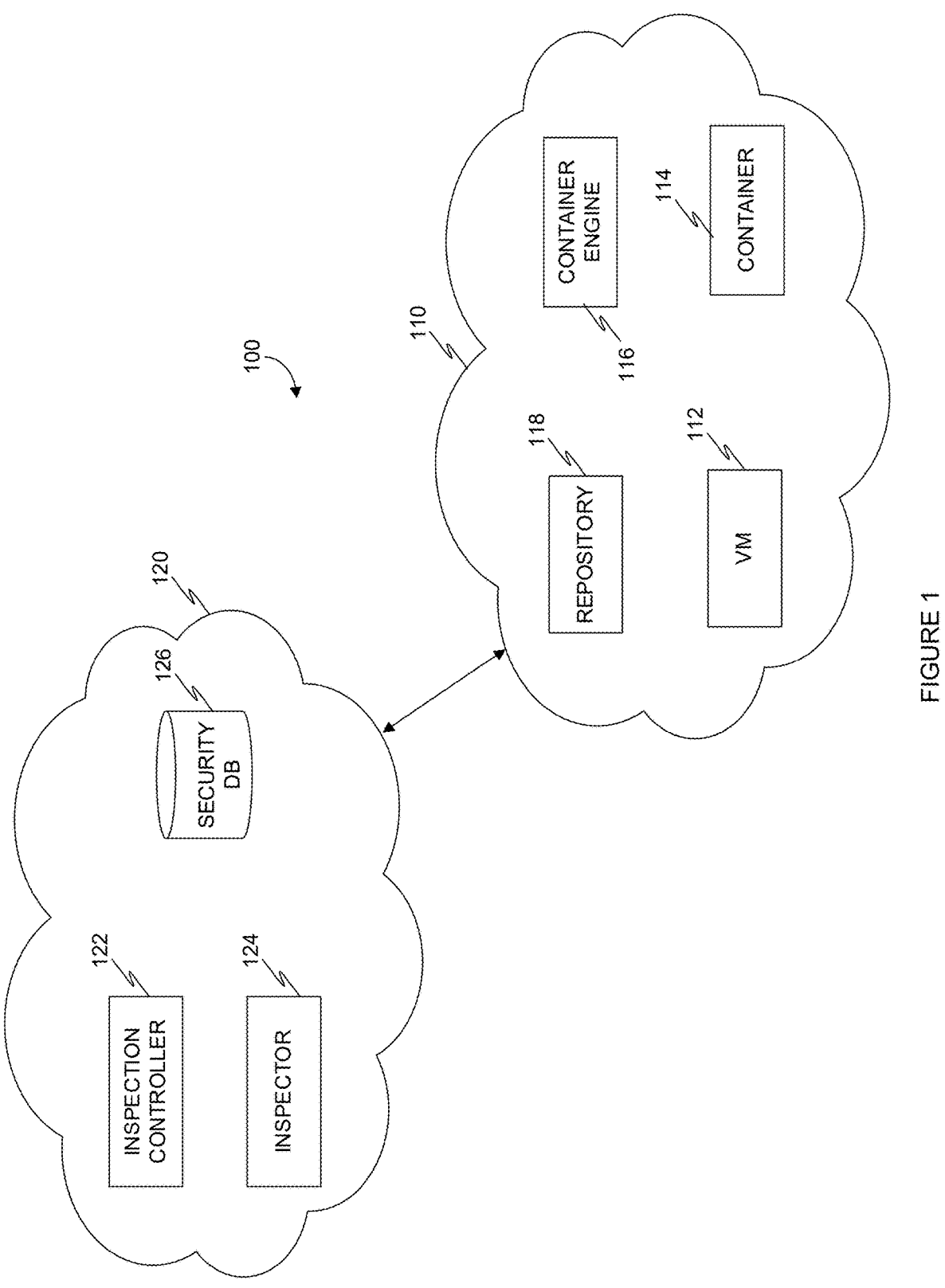
FIG. 1 is an example network diagram including a production environment and an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram 100 including a production environment 110 and an inspection environment 120, utilized to describe an embodiment. A production environment 110 is a cloud computing environment that provides services and resources to client devices. A client device (not shown) may be for example a laptop computer, personal computer, other computing device, and the like, that is in a network external to the cloud computing environment, and the like. The production environment 110 may be implemented, for example, as a VPC on a cloud computing infrastructure, such as Amazon® Web Services (AWS), Google® Cloud Platform (GCP), Microsoft® Azure, and the like.

In an embodiment, the production environment 110 includes cloud entities, such as resources and principals. A resource is a cloud entity that supplies functionality, such as processing power, memory, storage, communication, and the like. A resource may supply more than one functionality. Resources may include, for example, virtual machines (VMs), such as VM 112, container engines such as container engine 116, serverless functions (not shown), and the like.

In an embodiment, the production environment 110 may further include an application programming interface (API), through which actions in the cloud environment may be triggered. A container engine 116 may be implemented using Kubernetes® or Docker®. A serverless function may be implemented using Lambda®. A VM 112 may be implemented using Oracle® VirtualBox, Azure Virtual Machines, and the like. In certain embodiments, the container engine 116 may configure a VM 112 to run a containerized application 114 (also referred to as container 114). The container engine 116 is configured to access a repository 118, such as AWS Elastic Container Registry (ECS), from which an image is pulled and mounted at a mount point to generate a live container, such as container 114.

A principal is a cloud entity that acts on a resource, meaning it can request, or otherwise initiate, actions or operations in the cloud environment that cause a resource to perform a function. A principal may be, for example, a user account, a service account, a role, and the like. In an embodiment, a principal is implemented as a data structure that includes information about an entity, such as a username, a password hash, an associated role, and the like. In an embodiment, a principal may include a privilege that allows the principal to configure the container engine 116 to run a container.

The production environment 110 is connected with an inspection environment 120. The inspection environment 120 is a cloud computing environment. In an embodiment, the inspection environment 120 is deployed on a cloud computing infrastructure shared with the production environment 110, in another cloud computing infrastructure not shared with the production environment 110, or a combination thereof. In certain embodiments, a portion of the inspection environment 120 is deployed in the cloud production environment 110. In some embodiments, certain workloads deployed in the inspection environment 120 may be deployed in the production environment 110. For example, the inspection environment 120 may access a principal, such as a service account, which allows the inspection environment 120 to initiate actions in the production environment 110.

The inspection environment 120 includes a plurality of inspector workloads, such as inspector 124. In an embodiment, the inspector 124 is configured to inspect virtual instances, such as container images, of the production environment 110 for cybersecurity threats. The inspector 124 may inspect a container, a container image, and the like, for security objects, such as secrets, keys, user account information, and the like. In some embodiments, the inspector 124 is configured to inspect the virtual instance for an application, an operating system, a binary file, a library file, a combination thereof, and the like.

The inspection environment 120 further includes a security database 126, which is a graph database. A security graph may be stored on the security database 126. The security graph includes a representation of the production environment 110. For example, cloud entities of the production environment 110 may each be represented as nodes in the security graph. In an embodiment, the security graph is generated based on objects detected by an inspector, such as inspector 124. In certain embodiments, a virtual instance (e.g., a virtual machine) is represented by a node stored in the security graph. A container, such as container 114, and a corresponding image from which the container was mounted, are also each represented by a node, wherein the node representing the container 114 is connected to a node representing the virtual instance (i.e., VM 112) which runs the container 114. In certain embodiments, generating an instruction to inspect a virtual instance (i.e., container 114) further includes querying a security graph to determine an identifier of a container image represented by a node that is connected to a node representing the container 114.

An inspection controller 122 (also referred to as controller 122) is further included in the inspection environment 120. In an embodiment, the controller 122 is a workload deployed in the inspection environment 120 which is configured to initiate inspection of cloud entities of the production environment 110, such as the cloud entities discussed above. For example, initiating inspection may include determining what cloud entities to inspect, when to inspect them, and the like.

Inspecting virtual instances, such as container 114, is a process that utilizes resources from the production environment 110, such as processing power (measured as I/O per second-IOPS), storage (e.g., for generating a snapshot which is stored and inspected), and the like. Further, while a live container is being inspected, the instance is able to devote less of its own resources to serving its purpose (e.g., providing a service) as those resources are directed in part to the inspection process, such as sending and receiving communication from an inspector 124. Therefore, it is advantageous to reduce this usage to a minimum, while still being able to inspect the entire contents of the container for cybersecurity threats.

In an embodiment, the controller 122 is configured to access a manifest of a volume associated with a container and detect, based on the manifest, a plurality of layer identifiers of the container 114, each layer including an application, an operating system, a configuration file, a combination thereof, and the like.

Figure 2:
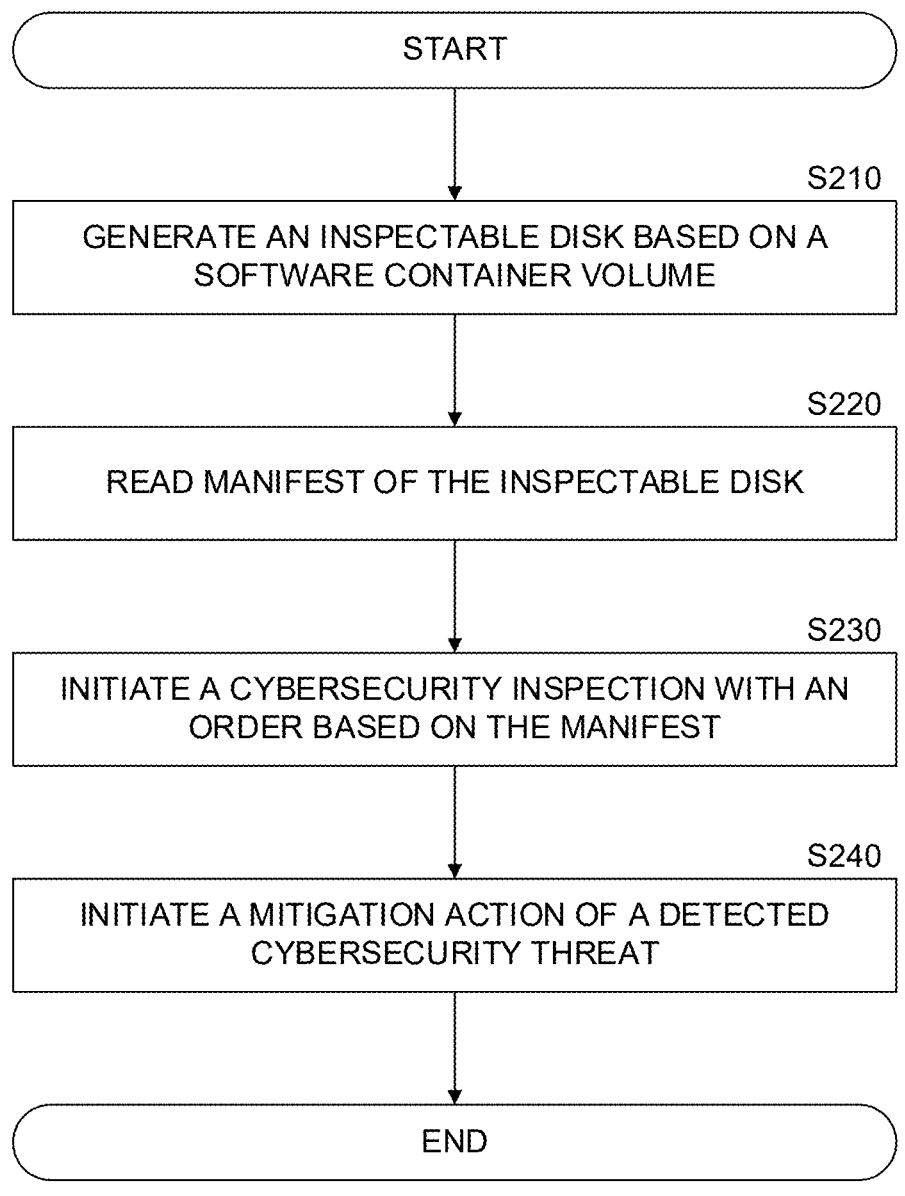
FIG. 2 is an example of a flowchart for inspecting a layered virtualization for a cybersecurity object, implemented in accordance with an embodiment.

FIG. 2 is an example of a flowchart for inspecting a layered virtualization for a cybersecurity object, implemented in accordance with an embodiment. In certain embodiments, a layered virtualization is a software container including a plurality of layers. In an embodiment, a cybersecurity object is an object, a threat, a vulnerability, an exposure, a malware, a combination thereof, and the like.

In certain embodiments, the cybersecurity object is a password, a software application, a certificate, an encryption key, a decryption key, a public encryption key, a private encryption key, a code object, a combination thereof, and the like.

At S210, an inspectable disk is generated. In an embodiment, an inspectable disk is generated based on a volume of a layered virtualization, such as a software container. In some embodiments, an inspectable disk is generated based on a snapshot, a clone, a copy, and the like, of the volume of the layered virtualization.

In certain embodiments, the inspectable disk is generated based on an instruction initiated by an inspection controller, the inspection controller configured to generate inspectable disks.

In some embodiments, the inspectable disk includes an image manifest. In some embodiments, the image manifest is a manifest file. For example, according to an embodiment, the manifest file is a Kubernetes® manifest file, implemented in a markup language such as YAML, JSON, and the like, and includes a description of resources associated with the cluster in which the original disk (based on which the inspectable disk was generated) is deployed.

In some embodiments, the manifest file includes a plurality of layers. For example, in an embodiment, a base layer is deployed from a base image, a first layer is deployed on top of the base layer based on an application, etc.

At S220, a manifest is accessed. In an embodiment, accessing a manifest includes accessing the manifest file of a container cluster. In certain embodiments, the manifest file is processed, for example by parsing the file. In an embodiment, parsing the manifest file includes searching the manifest file for a predetermined data field, and extracting a value associated with the predetermined data field.

In certain embodiments, the manifest includes a plurality of layer identifiers. In some embodiments, a layer is identified by a command, instruction, and the like, which initiate deployment of a virtual asset, provision a virtual asset, deploy an application, a combination thereof, and the like. In an embodiment, the manifest includes an order based on which various layers are deployed, such that a first layer is deployed before a second layer is deployed. In certain embodiments, the layer order is determined based on the manifest, for example by detecting that an instruction to deploy a second layer is nested in an instruction to deploy a first (e.g., base) layer.

At S230, inspection is initiated based on the manifest. In an embodiment, inspection is initiated for a cybersecurity object based on a layer that is selected based on the manifest. For example, in an embodiment, a base layer of the inspectable disk is inspected, e.g., by an inspector, for a first cybersecurity object, and a second layer of the inspectable disk is inspected for a second cybersecurity object. In some embodiments, inspecting the second layer for the second cybersecurity object is performed in response to detecting a cybersecurity object in the prior (e.g., base) layer.

For example, in an embodiment, a base image (i.e., base layer) is inspected for a cybersecurity object, such as an open port. A second layer, deployed on top of the base layer, is then inspected for a second cybersecurity object, such as an application configured to listen on the open port. In some embodiments, a second layer is inspected for a cybersecurity object that is not the second cybersecurity object, or is not inspected at all, based on an inspection of a prior layer.

For example, in an embodiment, inspection of a base layer determines that there are no open ports defined in the base layer. In an embodiment, inspection of the second layer for a second cybersecurity object is not initiated, is stopped, and the like, based on the determination of inspection of the base layer. This allows, in certain embodiments, to reduce inspection resources, as there is no need to inspect for a cybersecurity object that cannot be exploited. This is advantageous as it reduces resources such as processor time, processor power, memory, storage, and the like, which are required to perform cybersecurity inspection.

In an embodiment, a cybersecurity object is an endpoint, an open port, a password, a certificate, a cryptographic key, an encryption key, a decryption key, a policy, a file, an application, an operating system, a registry file, a directory name, a hash value, a code object, a malware code, a malware signature, a combination thereof, and the like.

At S240, a mitigation action is initiated. In an embodiment, a mitigation action is initiated in response to detecting: a cybersecurity object, a plurality of cybersecurity objects, a first cybersecurity object on a first layer and a second cybersecurity object on a second layer, a cybersecurity threat, a vulnerability, an exposure, a misconfiguration, a combination thereof, and the like.

In an embodiment, the mitigation action includes generating a representation on a security graph. In some embodiments, a security graph includes a representation of a computing environment, such as the production environment 110 of FIG. 2 above.

In certain embodiments, a security graph represents a resource, a principal, an enrichment, an endpoint, a mitigation action, a cybersecurity object, a cybersecurity threat, a malware object, a code object, combinations thereof, and the like, as a node in the security graph.

In certain embodiments, a node is generated in the security graph to represent a resource, such as a container cluster. Another node is generated in the security graph to represent a disk of the container cluster. Yet another node is generated in the security graph to represent a first layer of the disk, a second node is generated to represent a second layer, etc. In some embodiments, where a cybersecurity object is detected on a particular layer, a node is generated to represent the cybersecurity object, and the nodes are connected, for example by an edge.

In some embodiments, the mitigation action includes generating an instruction which when executed causes another resource, another layer, and the like, to be inspected for a cybersecurity object, a cybersecurity threat, a vulnerability, a misconfiguration, an exposure, a combination thereof, and the like. For example, in an embodiment, the mitigation action, when executed (e.g., by a processing circuitry) configures an inspector to inspect the inspectable disk for another cybersecurity object, cybersecurity threat, malware object, code object, file, folder, and the like.

In certain embodiments, the mitigation action includes deprovisioning of a virtual instance (such as a container pod, a container node, and the like), sandboxing a virtual instance, and the like.

Figure 3:
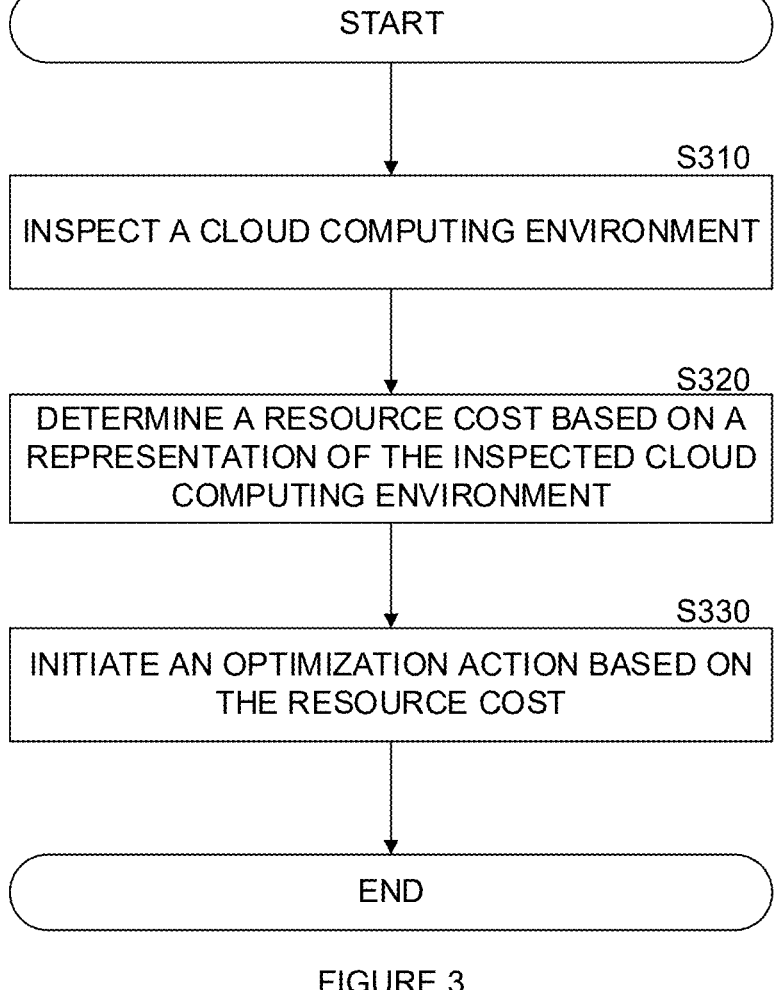
FIG. 3 is an example flowchart of a method for deploying resources in a computing environment based on use, implemented in accordance with an embodiment.

FIG. 3 is an example flowchart of a method for deploying resources in a computing environment based on use, implemented in accordance with an embodiment. In an embodiment, a constraint value is associated with a resource, a principal, an action, and the like, in a computing environment. For example, according to some embodiments, the constraint value is a cost, for example, a cost associated with deploying a resource. In an embodiment, the cost is associated with a resource type, a hardware type, a time frame, a combination thereof, and the like.

At S310, a cloud computing environment is inspected. In an embodiment, inspecting a cloud computing environment includes discovering resources, entities, principals, and the like, deployed in the computing environment. For example, according to an embodiment, inspecting a cloud computing environment includes performing network discovery. In an embodiment, an inspector workload is configured to discover resources deployed in a computing environment, such as a cloud computing environment.

In an embodiment, a result of network discovery, a result of workload inspection, a result of identity detection, and the like, are stored on a security database, for example, based on a predefined unified data schema. According to an embodiment, a result is stored as a representation in a security database, which includes a representation of the cloud computing environment, enrichments generated based on the same, application endpoints, network components, and the like.

In certain embodiments, an identity and access management (IAM) service, such as Okta®, is queried to determine what identities, principals, user accounts, service accounts, roles, etc., are authorized to initiate actions in the computing environment. In an embodiment, a representation of such identities and their corresponding access is likewise represented in the representation of the cloud computing environment stored in the security database.

In some embodiments, inspection includes detecting cloud logs, network logs, etc., which include data records of actions initiated in, performed in, and the like, the computing environment. For example, in an embodiment, a record in the cloud log includes an identifier of a first virtual machine which communicated with a second virtual machine having a second identifier.

At S320, a cost is associated with a representation. In an embodiment, the representation is a representation of a resource, of a resource portion, of an action in the computing environment, of a user account, a combination thereof, and the like. For example, in an embodiment, a representation of a software container cluster is associated with a cost of operating the cluster. In an embodiment, a software container cluster utilizes a plurality of applications, each application consuming resources allocated to the software container cluster. In some embodiments, each application running on the cluster is associated with a relative cost, for example, based on the total cost of the cluster and the percentage usage of each such application.

As another example, a cost is associated with a representation of a deployed machine image, such as an Amazon® machine image (AMI) in an AWS cloud computing environment. In such an embodiment, each additional AMI deployed in the cloud computing environment increases the cost of deployment.

In some embodiments, a cost is associated with a first resource based on a relationship of the first resource with a second resource. For example, in an embodiment, a serverless function, such as an Amazon® Lambda, is associated with a bucket (e.g., the serverless function writes events to a bucket). In an embodiment, the cost of the serverless function is a combination of the cost of deploying the serverless function and a cost of resource utilization of the bucket.

In certain embodiments, the cost is associated with a resource, a representation, and the like, which has no specific resource of its own. For example, in an embodiment, a virtual machine of an auto-scaling group (ASG) is assigned a resource associated with a cost. In some embodiments, a representation of the ASG is associated with a cost of deploying each virtual machine of the ASG.

In an embodiment, a cost is associated with any one of: each deployment of a software application, a software library, a software binary, a resource, a resource portion, an action, a combination thereof, and the like.

In some embodiments, an unused resource, unused principal, unused cloud entity, and the like is detected. For example, in an embodiment, a resource is detected, for which no log entries are detected. In an embodiment, a resource identifier is utilized to search a log for a record indicating that the resource is in communication with another resource, is accessed by another resource, is accessed by a principal, a combination thereof, and the like.

In certain embodiments, it is advantageous to determine the owner of a resource. For example, in an embodiment, a code object from an IaC environment is associated in the security database with a resource (e.g., a virtual machine) deployed in the cloud computing environment.

In an embodiment, an owner of the code object, such as an author of a code repository, an author of the code object, and the like, is determined. In some embodiments, the author is represented as a principal in the security database. In certain embodiments, a cost is determined for a principal by detecting representations in the security database that are connected to the representation of the principal, and determining for each entity represented by the connected representations a cost.

According to an embodiment, a code object is analyzed, for example using static analysis techniques, to determine an operational cost. In some embodiments, a code object is analyzed to detect a usage pattern. In an embodiment, a usage pattern includes the frequency of accessing a network, the frequency of accessing network resources, etc. For example, in an embodiment, a number of IOPS are determined for a code object. In some embodiments, a benchmark test is performed and resource utilization is based on a result of the benchmark test.

In some embodiments, usage is determined using runtime data received from a sensor deployed on a resource, by performing network traffic analysis respective of the resource, by analyzing VPC flow logs including an identifier of the resource, by performing traffic mirroring, a combination thereof, and the like.

In some embodiments, a cybersecurity threat is detected. For example, in an embodiment, a cybersecurity threat is detected based on a cybersecurity object, a forensic finding, a software artifact, a code object, a malware object, a combination thereof, and the like.

In certain embodiments, a cost is associated with the detected cybersecurity threat. For example, in an embodiment, the cybersecurity threat is a cryptominer application executed on a virtual machine. The cryptominer utilizes resources of the virtual machine, and such resource consumption is costly. In an embodiment, a cost of a cybersecurity threat is determined based on resource usage, time of resource usage, a combination thereof, and the like.

At S330, an optimization action is initiated. In some embodiments, the optimization action includes an instruction for execution in the cloud computing environment. According to some embodiments, the optimization action is based on the determined cost.

In certain embodiments, a plurality of optimization actions are initiated in the computing environment. According to an embodiment, an optimization action is generated to minimize resource utilization, optimize resource utilization, and the like, in the cloud computing environment.

For example, according to an embodiment, the optimization action includes reducing a number of workloads deployed in the computing environment. In an embodiment, reducing a number of workloads includes, for example, reducing a number of nodes in a software container cluster, reducing a number of virtual machines deployed in the computing environment, reducing attributes of the cloud computing environment, and the like.

In some embodiments, the optimization action includes configuring a resource to utilize a different specification. For example, in an embodiment, the optimization action includes adding retention, removing retention, generating a lifecycle rule, generating a scaling rule, a combination thereof, and the like.

According to certain embodiments, the optimization action includes altering a resource specification. For example, in an embodiment, the resource specification includes a memory allocation, a processor type, a network bandwidth, a storage capacity, a combination thereof, and the like. In some embodiments, for example, where a processor of a first type is determined to be underutilized, the optimization action includes altering the specification of the resource from the first type to a second type, wherein the second type is a less powerful processing circuitry than the first type.

In an embodiment, an attribute is, for example, a network address translation (NAT) which is not utilized by a particular subnet. It is therefore advantageous to remove such an attribute to decrease the cost of operation.

In some embodiments, a code object, software library, software binary, and the like, are detected which are determined to be less effective than a more up-to-date software version. For example, a certain software library utilizes more memory space (and therefore has increased cost) when compared to an up-to-date version of the same software library. In such an embodiment, the optimization action includes updating the software version in order to reduce cost of deployment.

In an embodiment, a baseline is established for a resource, a principal, and the like, for resource consumption in the computing environment. In some embodiments, where the resource, principal, etc., is utilizing more resources, less resources, etc., than the established baseline, the optimization action includes generating an alert based on an anomalous resource consumption detection.

According to an embodiment, a baseline is further utilized to detect cybersecurity threats. For example, in an embodiment, a potential cybersecurity threat is detected in response to determining that a resource cost of a resource, a group of resources, etc., has changed. In some embodiments, the change is a higher cost (e.g., higher resource utilization).

For example, in an embodiment, a baseline for resources allocated to a machine in a cloud computing environment includes a processor utilized between 50-60%, and a memory utilized up to 80%. In an embodiment, a baseline deviation condition is determined. For example, where the processor utilization is detected as being over 80%, the memory utilization is detected at over 90%, a combination thereof, and the like, an event is detected which is a potential cybersecurity threat.

In an embodiment, an inspector is configured to inspect a resource having a potential cybersecurity threat. In some embodiments, a potential cybersecurity threat is associated with certain cybersecurity objects, software artifacts, a combination thereof, and the like. According to an embodiment, the inspector is configured to first inspect for associated objects of the potential cybersecurity threat, and further configured to perform secondary inspection for additional cybersecurity objects in response to detecting that an associated object is not detected on the resource.

In certain embodiments, the optimization action includes deprovisioning, spinning down, and otherwise reducing unused resources. For example, in some embodiments, a virtual machine is determined to be not in use based on a lack of event records in an event log, based on a disk usage below a predetermined threshold, based on network bandwidth utilization below a predetermined threshold, a combination thereof, and the like.

According to an embodiment, a database resource is determined to be unused where the database is determined to not be exposed from the machine on which it is deployed, no local user is detected by static analysis, no activity in a local log of the database, etc.

In an embodiment, a code object is generated as part of the optimization action. In an embodiment, a code object is generated based on a detected code object, such that the generated code object provides the same functionality as the detected code object, utilizing fewer resources. In some embodiments, the code object is generated to deploy a resource that utilizes less processing power, less network bandwidth, less IOPS, less memory, a combination thereof, and the like.

In certain embodiments, a configuration of the code object is updated to "right-size" a deployed instance in order to match its actual resource utilization. For example, a resource utilizing 30% of a processing circuitry capacity can be updated to a different processor which has less compute capability, and would result in a higher utilization of the newly provisioned processor, and decrease the overall cost of operating the cloud computing environment.

Figure 4:
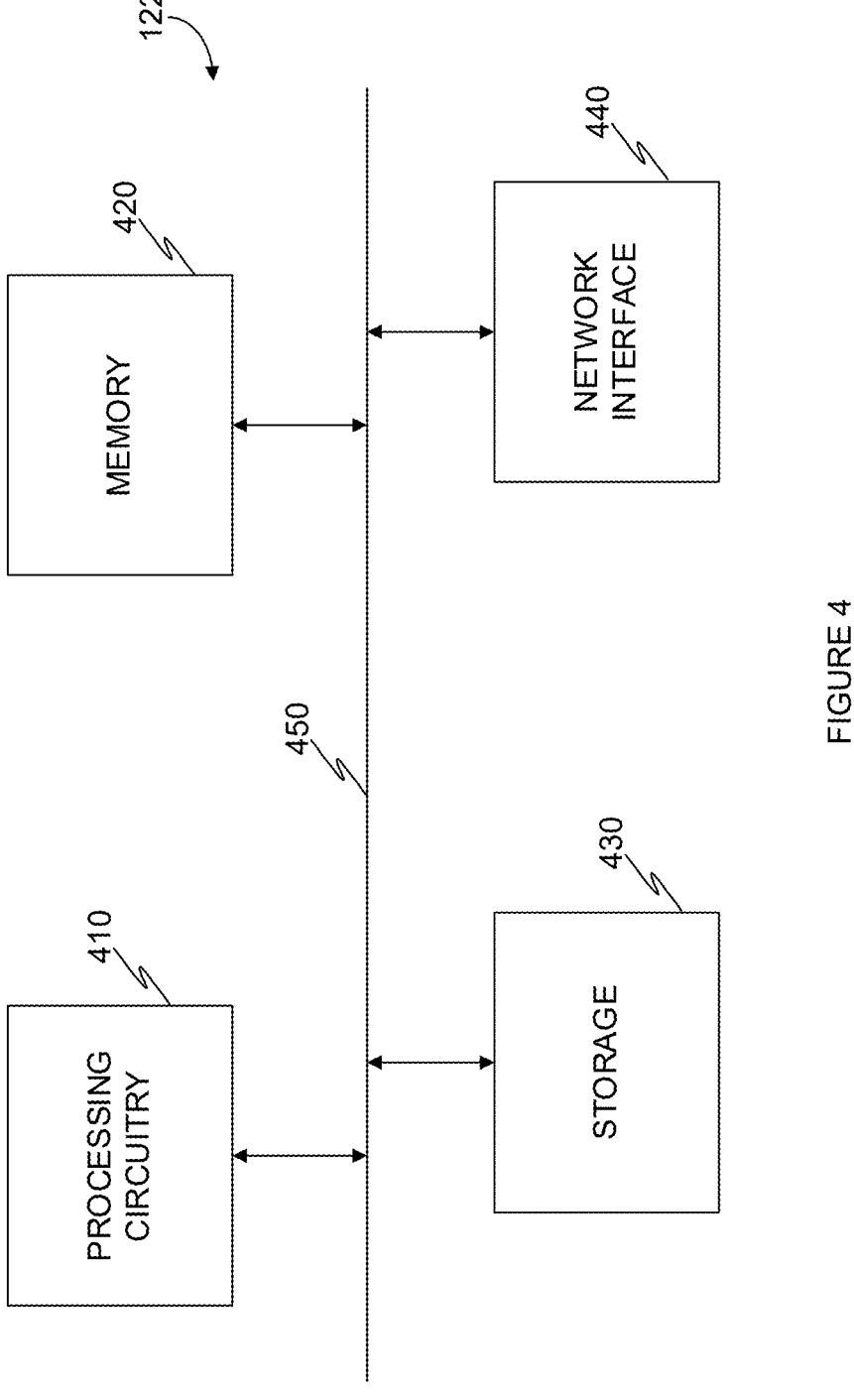
FIG. 4 is an example schematic diagram of an inspection controller according to an embodiment.

FIG. 4 is an example schematic diagram of an inspection controller 122 according to an embodiment. The inspection controller 122 includes, according to an embodiment, a processing circuitry 410 coupled to a memory 420, a storage 430, and a network interface 440. In an embodiment, the components of the inspection controller 122 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read-only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspection controller 122 with communication with, for example, the inspector 124, the security database 126, the cloud computing environment 110, a combination thereof, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the inspector 124, the security database 126, a combination thereof, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing deployment of a cloud computing environment, comprising:

inspecting the cloud computing environment;

generating a representation of the cloud computing environment based on a result of inspecting the cloud computing environment;

determining a resource cost associated with each entity of a plurality of entities represented in the generated representation of the cloud computing environment, wherein the determining of the resource cost comprises detecting a plurality of software components associated with the resource;

generating an optimization action for an entity of the plurality of entities, wherein the optimization action reduces the determined resource cost based on an associated resource cost of each software component of the plurality of software components of the entity; and initiating the optimization action in the cloud computing environment, wherein the optimization action further comprises:

detecting a code object utilized to deploy the software component in the cloud computing environment;

replacing computer code in the code object to generate a new code object, wherein the new code object is configured to utilize less resources when executed than the detected code object;

deploying a new software component in the cloud computing environment based on the new code object; and halting the deployed software component from further execution.

2. The method of claim 1, further comprising:

determining a usage baseline for the entity of the plurality of entities;

detecting an anomalous usage based on the determined usage baseline; and generating the optimization action further based on the detected anomalous usage.

3. The method of claim 1, further comprising:

initiating the optimization action to update a software component of the plurality of software components.

4. The method of claim 1, further comprising:

detecting a resource in the cloud computing environment having a resource usage below a predetermined threshold; and initiating the optimization action to deprovision the detected resource.

5. The method of claim 4, further comprising:

detecting a network bandwidth usage below a predetermined threshold; and detecting a disk usage below another predetermined threshold.

6. The method of claim 1, further comprising:

detecting in the representation a principal associated with a plurality of resources; and determining a resource cost of the principal based on each resource cost of a resource of the plurality of resources.

7. The method of claim 1, further comprising:

detecting a code object utilized to deploy a plurality of resources in the cloud computing environment; and generating a new code object based on the detected code object, wherein a resource deployed based on the new code object utilizes fewer resources than a resource deployed based on the detected code object.

8. The method of claim 1, further comprising:

detecting a code object utilized to deploy a resource in the cloud computing environment;

analyzing the code object to detect a resource usage pattern; and generating a new code object, in response to determining that the detected resource usage pattern exceeds a predetermined threshold.

9. The method of claim 1, further comprising:

initiating the optimization action in response to detecting a misconfiguration of an entity of the plurality of entities.

10. The method of claim 1, further comprising:

generating the optimization action to increase utilization of any one of: a processor, a memory, a storage, a network bandwidth.

11. The method of claim 1, further comprising:

determining a usage baseline for the entity of the plurality of entities;

detecting an anomalous usage based on the determined usage baseline; and generating a potential cybersecurity threat event based on the detected anomalous usage.

12. The method of claim 11, further comprising:

initiating inspection of the entity.

13. The method of claim 12, further comprising:

generating an inspectable disk based on a disk associated with the entity; and inspecting the inspectable disk for a cybersecurity object, wherein the cybersecurity object indicates that the potential cybersecurity threat is an actual cybersecurity threat.

14. The method of claim 13, further comprising:

initiating a remediation action in response to detecting the cybersecurity object, wherein the remediation action is based on the actual cybersecurity threat.

15. A non-transitory computer-readable medium storing a set of instructions for optimizing deployment of a cloud computing environment, the set of instructions comprising:

one or more instructions that, when executed by one or more processors of a device, cause the device to:

inspect the cloud computing environment;

generate a representation of the cloud computing environment based on a result of inspecting the cloud computing environment;

determine a resource cost associated with each entity of a plurality of entities represented in the generated representation of the cloud computing environment, wherein the determination of the resource cost comprises detecting a plurality of software components associated with the resource;

generate an optimization action for an entity of the plurality of entities, wherein the optimization action reduces the determined resource cost based on an associated resource cost of each software component of the plurality of software components of the entity; and initiate the optimization action in the cloud computing environment, wherein the optimization action further comprises:

detecting a code object utilized to deploy the software component in the cloud computing environment;

replacing computer code in the code object to generate a new code object, wherein the new code object is configured to utilize less resources when executed than the detected code object;

deploying a new software component in the cloud computing environment based on the new code object; and halting the deployed software component from further execution.

16. A system for optimizing deployment of a cloud computing environment comprising:

a processing circuitry;

a memory, the memory containing instructions that, when executed by the processing circuitry, configure the system to:

inspect the cloud computing environment;

generate a representation of the cloud computing environment based on a result of inspecting the cloud computing environment;

determine a resource cost associated with each entity of a plurality of entities represented in the generated representation of the cloud computing environment, wherein the determination of the resource cost comprises detecting a plurality of software components associated with the resource;

generate an optimization action for an entity of the plurality of entities, wherein the optimization action reduces the determined resource cost based on an associated resource cost of each software component of the plurality of software components of the entity; and initiate the optimization action in the cloud computing environment, wherein the optimization action further comprises:

detecting a code object utilized to deploy the software component in the cloud computing environment;

replacing computer code in the code object to generate a new code object, wherein the new code object is configured to utilize less resources when executed than the detected code object;

deploying a new software component in the cloud computing environment based on the new code object; and halting the deployed software component from further execution.

17. The system of claim 16, wherein the memory contains further instructions which when executed by the processing circuitry further configure the system to:

determine a usage baseline for the entity of the plurality of entities;

detect an anomalous usage based on the determined usage baseline; and generate the optimization action further based on the detected anomalous usage.

18. The system of claim 16, wherein the memory contains further instructions which when executed by the processing circuitry further configure the system to:

detect a resource in the cloud computing environment having a resource usage below a predetermined threshold; and initiate the optimization action to deprovision the detected resource.

19. The system of claim 18, wherein the memory contains further instructions which when executed by the processing circuitry further configure the system to:

detect a network bandwidth usage below a predetermined threshold; and detect a disk usage below another predetermined threshold.

20. The system of claim 16, wherein the memory contains further instructions which when executed by the processing circuitry further configure the system to:

detect in the representation a principal associated with a plurality of resources; and determine a resource cost of the principal based on each resource cost of a resource of the plurality of resources.

21. The system of claim 16, wherein the memory contains further instructions which when executed by the processing circuitry further configure the system to:

detect a code object utilized to deploy a plurality of resources in the cloud computing environment; and generate a new code object based on the detected code object, wherein a resource deployed based on the new code object utilizes fewer resources than a resource deployed based on the detected code object.

22. The system of claim 16, wherein the memory contains further instructions which when executed by the processing circuitry further configure the system to:

detect a code object utilized to deploy a resource in the cloud computing environment;

analyze the code object to detect a resource usage pattern; and generate a new code object, in response to determining that the detected resource usage pattern exceeds a predetermined threshold.

23. The system of claim 16, wherein the memory contains further instructions which when executed by the processing circuitry further configure the system to:

initiate the optimization action in response to detecting a misconfiguration of an entity of the plurality of entities.

24. The system of claim 16, wherein the memory contains further instructions which when executed by the processing circuitry further configure the system to:

generate the optimization action to increase utilization of any one of:

a processor, a memory, a storage, a network bandwidth.

25. The system of claim 16, wherein the memory contains further instructions which when executed by the processing circuitry further configure the system to:

determine a usage baseline for the entity of the plurality of entities;

detect an anomalous usage based on the determined usage baseline; and generate a potential cybersecurity threat event based on the detected anomalous usage.

26. The system of claim 25, wherein the memory contains further instructions which when executed by the processing circuitry further configure the system to:

initiate an inspection of the entity.

27. The system of claim 26, wherein the memory contains further instructions which when executed by the processing circuitry further configure the system to:

generate an inspectable disk based on a disk associated with the entity; and inspect the inspectable disk for a cybersecurity object, wherein the cybersecurity object indicates that the potential cybersecurity threat is an actual cybersecurity threat.

28. The system of claim 27, wherein the memory contains further instructions which when executed by the processing circuitry further configure the system to:

initiate a remediation action in response to detecting the cybersecurity object, wherein the remediation action is based on the actual cybersecurity threat.

* * * * *